Oct. 26, 1965 H. J. HERBRUGGEN 3,214,182
PACKING RING
Filed Feb. 27, 1962 2 Sheets-Sheet 1

INVENTOR.
HENRY J. HERBRUGGEN

BY Teare, Fetzer + Teare
ATTORNEYS

Oct. 26, 1965 H. J. HERBRUGGEN 3,214,182
PACKING RING
Filed Feb. 27, 1962 2 Sheets-Sheet 2

INVENTOR.
HENRY J. HERBRUGGEN
BY
Teare, Fetzer & Teare
ATTORNEYS

United States Patent Office 3,214,182
Patented Oct. 26, 1965

3,214,182
PACKING RING
Henry J. Herbruggen, Cleveland, Ohio
(1395 W. Melrose Drive, Westlake, Ohio)
Filed Feb. 27, 1962, Ser. No. 176,063
7 Claims. (Cl. 277—201)

This invention relates to packing rings or seals, and more particularly to a packing ring that is adapted to be expanded against sealing surfaces by operating fluid pressure, to provide an effective seal.

In the following specification and accompanying drawings the invention is shown and described in connection with an assembly of parts having reciprocating motion, as for instance a piston and cylinder arrangement, but it will be understood that the packing or sealing elements of the invention may also be effectively utilized in rotary motion arrangements.

The molded variety of packing rings such as O-rings and the channel type or U-cup rings are well known in the sealing art. However, thees types of packing rings have various shortcomings especially when used to provide a seal in a reciprocating motion arrangement. An O-ring packing has a tendency to twist, and is comparatively easily cut by foreign matter on the confronting surface of a part of the rotary or reciprocating motion arrangement. In either of the latter cases leakage of the operating fluid will occur. The chanel or U-cup packing in which the side walls or wings are adapted to be expanded by operating fluid pressure in the channel and into sealing relationship with the confronting walls or surfaces of the relatively movable parts of the assembly, will not generally twist and usually is effective to wipe off foreign matter. However, the channel or U-cup type of seal does not offer effective sealing characteristics under low pressure operating conditions due to the flexibility of the wings or lips of the seal. Accordingly, it is oftentimes necessary to use spring operated or some other type of expander means with the channel or U-cup type of packing, so as to hold the wings or lips of the U-cup expanded when there is no fluid pressure, or when the pressure is insufficient to maintain the seal. In the use of both types of packings (i.e. the O-ring and the U-cup) the thickness of the body of the packing ring is generally greater than the receiving space or clearance gap between the operating parts of the assembly being sealed, and by virtue of the resiliency or elastic memory of the plastic material of the packings, a certain contact pressure is achieved between said packing and the confronting surfaces of the parts to be sealed. This contact pressure is generally greater with O-ring type of packings as compared to the U-cup variety, and thus the O-ring packing generally provides a better seal especially under low pressure operating conditions.

The present invention provides a novel packing or seal that will not twist upon application thereto of operating fluid pressure, and wherein in one embodiment thereof, a single packing is operative to seal the confronting surfaces between a double acting type of reciprocal motion arrangement. The invention also provides a packing having fluid transmitting means, such as at least one generally radially extending groove in an end surface thereof, for passage of fluid therethrough, to prevent a build-up or entrapment of fluid pressure behind the packing, upon application of operating fluid pressure to the packing. Such fluid transmitting means will provide a packaging which will be readily urged into sealing engagement with the confronting surfaces of the relatively movable parts of an assembly being sealed upon the application of fluid pressure to the "fluid pressure" end surface of the seal, and which will respond substantially instantaneously into sealing engagement, and even though initially the sealing sides or surfaces of the packing may only barely touch the confronting surfaces of the relatively movable parts of the assembly.

Accordingly, an object of the invention is to provide a packing or sealing element which has greatly improved sealing characteristics as compared to prior art arrangements of packing elements.

Another object of the invention is to provide a novel packing wherein a single packing can be utilized to seal confronting surfaces between a double acting type of reciprocal motor arrangement and in a manner heretofore unknown in the art.

A further object of the invention is to provide a packing which will furnish an effective seal between relatively movable parts of an assembly even though the tolerances between such parts are greater than those heretofore provided.

A more specific object of the invention is to provide a packing ring in which the body of the ring is of generally hexagonal configuration in axial cross section, and wherein there is provided at least one radially extending groove in each of the front and rear end surfaces of the packing.

Another specific object of the invention is to provide a generally U-cup type packing having at least one radial extending groove in the rear end surface of the packing, or in other words in the surface which is not adapted for engagement with operating fluid pressure.

Other features and advantages of the invention will be apparent from the following description taken in conjunction with the accompanying drawings wherein.

Figure 1:
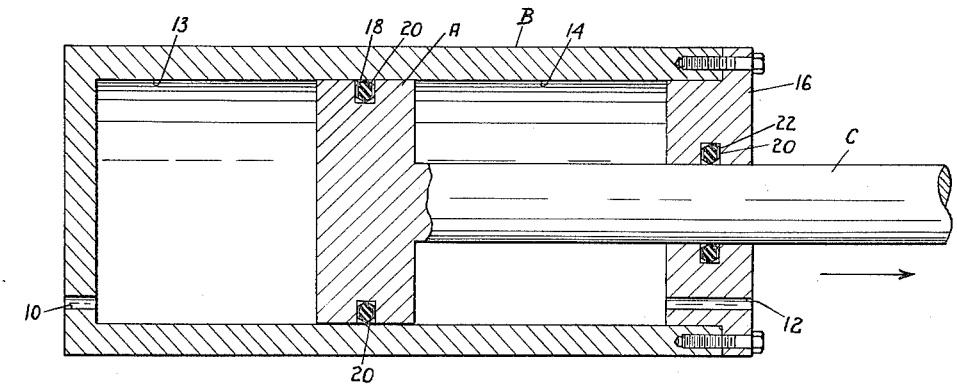
FIG. 1 is a vertical, sectional, generally diagrammatic view of a packing seal of the invention disposed in the environmental setting of a double acting reciprocating motion arrangement, and more particularly in a double acting piston and cylinder assembly.

Referring now again to the drawings and in particular to FIGS. 1 to 5 thereof, there is shown a double acting piston and cylinder assembly having passageways 10 and 12 for passage therethrough of pressurized operating fluid. A piston A is disposed in cylinder B and divides the latter into an expansible front chamber 13 and an expansible rear chamber 14. Piston A has a piston rod C extending outwardly of the cylinder chamber 14. A removable cap member 16 may close one end of the cylinder chamber, 14 and guide the piston rod C for axial movement with respect to cylinder B. Piston A has a groove 18 extending circumferentially therearound, and which is adapted to receive therein a packing or sealing element 20 constructed in accordance with the instant invention. Cap member 16 may also have an arcuate-like groove 22 therein and may receive another of the packing seals of the invention.

Figure 2:
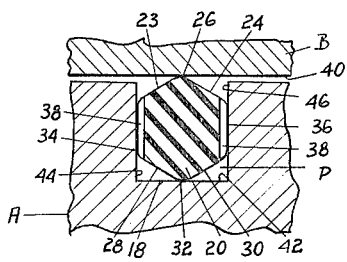
FIG. 2 is an enlarged, fragmentary, vertical sectional view taken from the assembly of FIG. 1, and illustrating the packing ring in normal assembled position.
Figure 3:
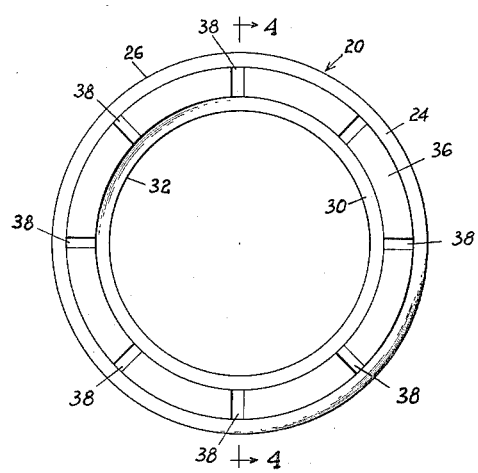
FIG. 3 is an elevational view of the packing ring of FIGS. 1 and 2.
Figure 4:
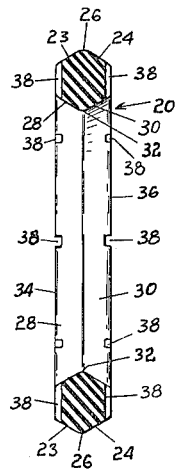
FIG. 4 is a vertical sectional view taken generally along the plane of line 4—4 of FIG. 3.

Referring in particular to FIGS. 2, 3 and 4, packing or seal 20 in the form shown in the drawings comprises a resilient closed ring of rubber or plastic-like material, with the body of the ring being of generally hexagonal configuration in axial cross section, and in the embodiment shown in FIGS. 2, 3 and 4 having substantially equal sides and angles, and thus being of a regular polygonal configuration. As best shown in FIG. 4, the outer side surfaces 23 and 24 converge with respect to one another in an upward or radially outward direction and merge at outer juncture or ridge 26, while the inner side surfaces 28 and 30 converge with respect to one another in a downward or radially inward direction and meet or merge at inner juncture or ridge 32. The end surfaces 34 and 36 of the packings are generally vertically extending and parallel with respect to one another and merge with respective surfaces 23, 28 and 24, 30.

A plurality of fluid passing means, such as the circumferentially spaced generally radial extending grooves or passageways 38 in both end surfaces 34, 36, may be provided for a purpose to be hereinafter discussed.

When the packing ring is in assembled position in the groove 18 of piston element A, or in the groove 22 of head or cap member 16 of the piston and cylinder unit, the spacing between the confronting surfaces 40 and 42 (FIG. 2) of the cylinder B and piston A respectively, is preferably such that the body of the packing ring will be somewhat or slightly squeezed or compressed by such surfaces so that at least some contact occurs between the packing ring ridges 26 and 32 and surfaces 40 and 42 respectively, and the planar end surfaces 34, 36 of the packing ring may be disposed generally in engaged relation with the respective confronting end surfaces 44, 46 of the groove in the piston A. When the piston A moves in the direction of the arrow in FIG. 1 due to application of operating fluid pressure thereto in chamber 13, the operating fluid pressure acting upon inner and outer side surfaces 23, 28 and in end passageways 38 of end surface 34 of the packing, and on the latter, compress or deform the packing and provide increased sealing engagement between the ridge portion 26, 32 of the packing, and the confronting surfaces of respectively the cylinder wall and the groove. It will be noted that the passageway 38 in end surface 34 provide for the ready entry of operating fluid pressure into engagement with the inner side surface 28 of the packing even if initially, end surface 34 is in tight engagement with the confronting end surface 44 of groove 18. Twisting of the packing in groove 18 is prevented by the pressurized engagement of planar end surface 36 of the packing into generally surface-to-surface orientation with its confronting end surface 46 of groove 18, due to the operating fluid pressure in chamber 13, thus ensuring good sealing characteristics for the packing.

The relatively greater resultant contact pressure and the increased area of contact between the packing ring ridge portions and surfaces 40, 42 being sealed, upon application of fluid pressure to chamber 13 of the cylinder, may permit the use of a lower initial contact or assembly pressure between the packing ring and the surfaces being sealed, as compared to conventional O-ring types of packings, and thus will provide longer wearing characteristics for the packing of the invention. Moreover, the manufacturing tolerances between the relatively movable parts of the assembly can be greater, resulting in a more economically manufactured unit since the packing is subject to a greater compression or deformation by the operating fluid pressure as compared to an O-ring, and thus a greater urging into sealing relationship with the confronting surfaces being sealed. The radially extending grooves or slots 38 in the "no operating fluid pressure" end surface 36 of the packing (assuming movement of the piston A in the direction of the arrow) insures that any fluid disposed or trapped in the area P of the groove 18 can readily escape through the passageways in end surface 36 and thus cannot create a back pressure to oppose sealing between the ridge portion 32 and the opposing groove surface 42, and the effective seating of end surface 36 against groove surface 46, upon application of operating fluid pressure to the fluid pressure engaging face of the seal. This release of any fluid back pressure in area P of the groove, coupled with the generally abutting engagement of surface 36 with the confronting surface 46 of the groove, prevents any twisting of the packing in position, and thus stabilizes the packing in the groove, and effectively prevents leakage of operating fluid around the packing seal.

Application of operating fluid pressure to the opposite chamber 14 of the cylinder B reverses the above with piston A moving in a direction opposite to that of the arrow of FIG. 1 and with slots 38 in end surface 34 of the packing preventing a build up of back pressure, and with such end surface 34 especially resisting twisting of the packing, due to its generally surface-to-surface engagement with opposing surface 44 of groove 18.

Figure 5:
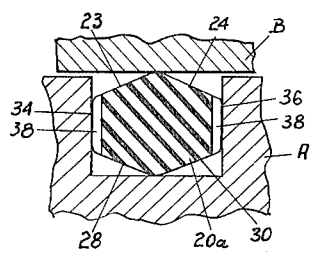
FIG. 5 is an enlarged, fragmentary, vertical sectional view of a modified form of the packing seal.
Figure 6:
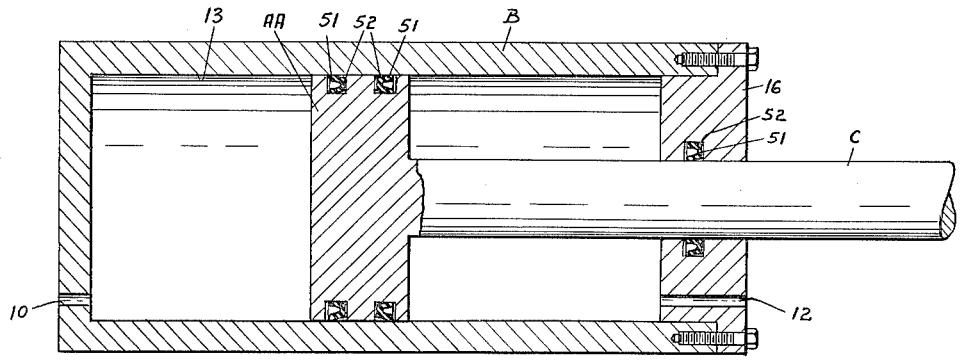
FIG. 6 is a vertical sectional view of another embodiment of the packing seal, disposed in the environmental setting of a double acting reciprocating motion assembly, and more particularly a piston and cylinder arrangement.
Figure 7:
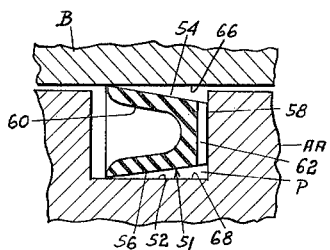
FIG. 7 is an enlarged, fragmentary, vertical sectional view taken from the assembly of FIG. 6 and illustrating the left hand piston head packing ring in normal assembled position, and with no substantial operating fluid pressure being exerted against the packing seal.
Figure 8:
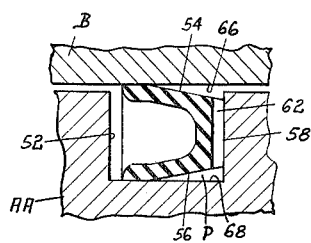
FIG. 8 is a view generally similar to that of FIG. 6 but illustrating the deformed or compressed condition of the packing ring, with operating fluid pressure exerted against the front face or operating fluid pressure engaging end surface of the packing.
Figures 9, 10:
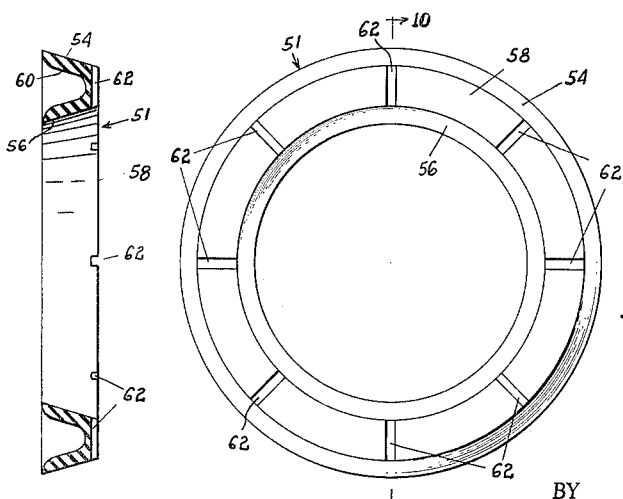
FIG. 9 is a rear end view of the packing ring of FIGS. 6 to 8.
FIG. 10 is a vertical sectional view taken generally along the plane of line 10—10 of FIG. 9.

In FIG. 5 of the drawings there is illustrated a modified form of the packing wherein the height of the cross section of the packing ring 20a is less than the length of the cross section thereof, and which may be expeditiously utilized in an environmental arrangement of relatively movable telescopically assembled parts wherein the fluid pressure on opposite ends of the packing is substantially the same. Such an irregular polygonal cross section effectively prevents twisting of the packing.

Referring now to FIGS. 6 through 10 there is shown another embodiment of a packing and one which is of a generally U-cup or channel shaped configuration in axial cross section. This embodiment is particularly adapted for use in a reciprocal arrangement, such as a double acting piston and cylinder assembly, similar to the piston and cylinder assembly of the first described embodiment. However, in order for the packing 51 to be effective for a double acting arrangement, there is provided a plurality of grooves 52 in the piston AA, extending substantially circumferentially therearound and each of which grooves is adapted to receive therein one of the U-cup type packings, with the concave front ends thereof facing in opposite directions. Such U-cup type packing 51 comprises a resilient, closed ring of rubber or plastic-like material, having generally straight and forwardly divergent outer and inner side wall surfaces 54, 56 when the ring is in free or non-compressed condition. The rear surface 58 of the ring is preferably substantially planar and vertically extending, and with the front surface 60 of the ring defining the U or concave configuration illustrated.

At least one, and preferably a plurality of circumferentially spaced generally radially extending slots 62 may be provided in the rear or "no fluid pressure engaging surface" of the packing ring.

When the packing ring is in assembled relation with the respective groove of the piston element AA, due to the inherent flexibility of the lips of the packing, the piston AA may not be able to be "carried" by the packings in the rest position of the piston, depending of course on the tension of the wings due to the material and the structural characteristics of the packing. However, upon application of operating fluid pressure to for instance the chamber 13 of the cylinder, the lips or wings of the packing are forced or deformed outwardly into increased sealing engagement with the confronting surfaces 66 and 68 of the cylinder and the associated piston groove respectively. The generally radially extending slots 62 in the rear surface of the packing prevent any back pressure from building up in the area P of the groove 52, and thus assures instantaneous movement of the packing lips into sealing engagement with the surfaces of the cylinder and piston, and especially in a low pressure situation, or a poor tolerance situation where the outer lip may be just barely touching the confronting surface of the cylinder. The substantially vertical rearward end surface 58 of the packing is adapted to engage in generally coplanar relation with the confronting vertical surface of the groove, and thus assures nontwisting of the packing in the groove, resulting in prevention of leakage of the operating fluid around the packing.

While the packings have been illustrated with a double acting reciprocal arrangement, it will be understood that such packing could be utilized in a single acting arrangement just as well, the only requisite being in connection with the FIGS. 6 to 10 embodiment that the operating fluid pressure be applied to the front or concave face 60 of the packing.

From the foregoing description and accompanying drawing it will be seen that the invention provides a relatively simple packing which will not twist or turn when in assembled position in a dynamic sealing assembly, a packing which will provide greatly increased sealing characteristics, and a packing which will permit the use of greater tolerances between the relatively movable parts of the assembly while still providing an effective seal, thereby resulting in a more economically desired unit assembly. The invention also provides in one embodiment thereof a packing which is effective for sealing in both axial directions in a double acting assembly utilizing a single seal.

The terms and expressions which have been used are used as terms of description and not of limitation and there is no intention in the use of such terms and expressions of excluding any of the features shown and described, or portions thereof, but it is recognized that various modifications are possible within the scope of the invention claimed.

I claim:

1. A packing capable of being deformed by fluid pressure adapted for insertion in an annular groove in the inner one of a pair of relatively axially movable members of a double-acting reciprocal motion unit for sealing the confronting surfaces between said members, said packing comprising a substantially closed body portion of generally resilient material capable of being deformed by fluid pressure, said body being adapted to be compressed between confronting surfaces of said parts and being of polygonal configuration in axial cross-section, said body portion including obliquely disposed inner and outer side surfaces and oppositely disposed generally linearly extending end surfaces adapted for engagement with confronting surfaces of said groove, and fluid passing means disposed in each of said end surfaces extending between and opening onto oppositely disposed of said inner and outer side surfaces for preventing a build-up of fluid back pressure in said groove.

2. A packing in accordance with claim 1, wherein said fluid passing means comprises spaced, generally radially extending slots, each of said slots opening at each of its ends onto the respective of said side surfaces.

3. In combination, a pair of relatively movable coacting parts, one of said parts having a peripheral endless groove therein, and a packing element disposed in said groove and sealing the clearance gap between said parts, said packing element comprising a substantially closed body portion of generally resilient material capable of being deformed by fluid pressure, said body portion being adapted to be compressed between confronting surfaces of said parts and being of polygonal configuration in axial cross section, said body portion including obliquely disposed inner and outer side surfaces and oppositely disposed generally linearly extending end surfaces adapted for engagement with confronting surfaces of said groove, and fluid passing means disposed in each of said end surfaces extending between and opening onto oppositely disposed of said inner and outer side surfaces for preventing a build-up of fluid pack pressure in said groove.

4. In combination, a pair of relatively axially movable parts disposed in telescoping relation, one of said parts having an annular peripheral groove therein, and a fluid pressure sealing member disposed in said groove and sealing the clearance gap between said parts while generally maintaining said parts out of contact with each other, said member comprising a ring-like body of generally flexible resilient material, said body being adapted to be compressed between confronting axially extending surfaces of said parts, said body being of polygonal configuration in axial cross section and comprising diagonally extending and outwardly converging outer side surfaces, diagonally extending and inwardly converging inner side surfaces, and generally linearly and parallel extending end surfaces, and fluid passing means disposed in each of said end surfaces and communicating between oppositely disposed of said inner and outer side surfaces and adapted to pass fluid therethrough for preventing the build-up of fluid back pressure in said groove during application of operating fluid pressure to said parts for actuating the same.

5. In combination, a pair of relatively axially movable parts disposed in telescoping relation, the inner one of said parts having an annular peripheral groove therein, and a fluid pressure sealing member disposed in said groove and sealing the clearance gap between said parts while generally maintaining said parts out of contact with each other, said member comprising a ring-like body of generally flexible resilient material disposed in said groove, said body being adapted to be compressed between confronting axially extending surfaces of said parts, said body being of generally hexagonal configuration in axial cross section and comprising generally radially outwardly converging outer side surfaces and generally radially inwardly converging inner side surfaces and generally linearly and parallel extending end surfaces, and a plurality of fluid passing means disposed in each of said end surfaces extending between and opening onto oppositely disposed of said inner and outer side surfaces and adapted to pass fluid therethrough for preventing a build-up of fluid back pressure in said groove.

6. The combination in accordance with claim 5 wherein said fluid passing means comprises a plurality of generally radially extending slots disposed in each of said end surfaces.

7. A packing capable of being deformed by fluid pressure adapted for insertion in an annular groove in the inner one of a pair of relatively axially movable members of a double-acting reciprocal motion unit for sealing the confronting surfaces between said members comprising, a ring-like body of generally resilient material, said body including obliquely disposed inner and outer side surfaces for sealing engagement with the confronting surfaces of said members, and oppositely disposed generally vertically extending front and rear surfaces, said front surface being the fluid pressure engaging surface of said packing upon movement of said inner member in one direction and said rear surface being the pressure engaging surface upon movement of the inner member in the opposite direction, said front and rear surfaces each having a plurality of circumferentially spaced generally radially extending slots therein, each of said slots opening at each of its ends onto the respective of said side surfaces, said front surface being engaged by fluid pressure to deform the side surfaces into sealing contact with the confronting surfaces of the members upon movement of the inner member in one direction with the slots in said rear surface providing for the release of fluid back pressure in said groove, and said rear surface being engageable by fluid pressure to deform the side surfaces into sealing contact with the confronting surfaces of the members upon movement of said inner member in the opposite direction with the slots in the front surface providing for the release of fluid back pressure in said groove.

References Cited by the Examiner

UNITED STATES PATENTS

| | | | |
|---|---|---|---|
| 356,785 | 2/87 | Purves | 277—201 X |
| 1,567,813 | 12/25 | Oleson | 277—201 X |
| 2,196,337 | 4/40 | Loweke | 277—215 X |
| 2,707,118 | 4/55 | Swartz et al. | 277—70 X |
| 2,728,620 | 12/55 | Krueger | 277—188 |
| 2,751,235 | 6/56 | Watt et al. | 277—70 |
| 3,027,168 | 3/62 | Herbruggen | 277—215 |
| 3,061,895 | 11/62 | Kleinhans | 277—201 X |

FOREIGN PATENTS 304,373   1/29   Great Britain.

LEWIS J. LENNY, *Primary Examiner.*

EDWARD V. BENHAM, *Examiner.*